United States Patent Office 3,214,477
Patented Oct. 26, 1965

3,214,477
STABILIZED FORMALDEHYDE SOLUTION
George N. Butter, Terre Haute, Ind., assignor to Commercial Solvents Corporation, a corporation of Maryland
No Drawing. Filed Dec. 16, 1963, Ser. No. 330,553
18 Claims. (Cl. 260—606)

This application is a continuation-in-part of application Serial No. 177,163, filed March, 5, 1962, now abandoned.

My invention relates to stabilized formaldehyde solutions. More particularly my invention relates to formaldehyde solutions stabilized against excessive polymerization and to a method for stabilizing formaldehyde solutions.

Formaldehyde, a product used in large quantities in the chemical industry, is generally transported as a 35–50% aqueous solution. Transportation of such solutions, however, is aggravated by the tendency of formaldehyde to polymerize and then to settle out as a polymerized solid from the solution. Polymerization and concurrent deposition increase with decreases in temperature. Thus, during cold seasons, transportation of concentrated formaldehyde solutions becomes impractical.

Various procedures have been attempted to minimize polymerization and solid deposition in formaldehyde solutions. For example, very low concentrations of formaldehyde in the solution on the order of 5–10% can be transported even in cold weather without excessive polymerization and deposition. However, since water is the main component, this method is practical only when small amounts of formaldehyde are transported. Also, various preservatives such as methanol, when incorporated in amounts of about 5–20% into the formaldehyde solution, have demonstrated ability to impede polymerization even when used with concentrations of formaldehyde as high as 35–50%. The addition of such large amounts of methanol, however, not only is costly but necessitates separation of the methanol from the formaldehyde solutions before use can be made of the formaldehyde. More recently it has been found that small amounts of hydroxylamine hydrochloride impede but do not completely prevent polymerization of formaldehyde and deposition from the aqueous solution of the solid polymerized material even under low temperature conditions. However, the difficulty in using hydroxylamine hydrochloride is that the material which does polymerize and settle as a solid deposit from the formaldehyde solution on subjection to lower temperature does not return to solution with a subsequent rise in temperature thus resulting not only in loss of material but necessitating the separation of the polymerized solid from the formaldehyde solution.

I have now discovered a means whereby formaldehyde solutions of industrial concentrations, for instance from about 10 to 70 percent, can be substantially preserved against polymerization and deposition of solid material even when subjected to temperatures at which uninhibited formaldehyde solutions deposit substantial amounts of polymerized formaldehyde. More important, however, my invention permits ready resolution of polymerized formaldehyde which has been deposited at low temperatures merely by slightly raising the temperature of the solution.

Generally my invention involves addition of polymerization retarding amounts of amides having the following general formula to formaldehyde solutions:

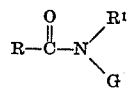

wherein R represents the residue of a carboxylic acid (e.g., an alkyl or alkenyl radical) having at least 7 carbon atoms, $R^1$ represents ether hydrogen or lower alkyl, and G represents the radical of a glycitol, e.g., a sugar alcohol such as sorbitol (glucitol), dulcitol (galactol), arabitol, mannitol, ribitol, xylitol, etc.; in other words, a glycityl radical having at least 5 and up to 7 carbon atoms usually up to about 6 carbon atoms. Such radicals are, respectively, sorbityl (glycityl), dulcityl (glactityl), arabityl, mannityl, ribityl, xylityl, etc. The amides thus include sugaramides, e.g., $C_6$ sugaramides such as N-(1-glycityl)-N-methylstearamide, for instance.

My polymerization inhibitors can be prepared by condensation of a long-chain carboxylic acid with a glycamine having the following general formula:

where $R^1$ and G are defined as above. Such long-chain acids include fatty acids of 8 to 30 carbon atoms such as decanoic acid, oleic acid, stearic acid, lauric acid, tricontanoic acid, capric acid, caprylic acid and the like. The glycamines which can be used in preparing my polymerization inhibitors include N-butyl glucamine, N-methyl glucamine, N-ethyl glucamine, N-isopropyl glucamine, N-methyl galactamine, N-methyl fructamine, etc., and the like.

Included among the inhibitors of my invention are N-glucatylstearoylamide (N-glucatylstearamide), N-methyl-N-glucatyloleoylamide, N - methyl - N-glucatylstearoylamide, N-methyl-N-glucatyllauroylamide, N-methyl-N-glucatylcapryloylamide, N - methyl - N - glucatylcaproylamide, N-butyl-N-glucatyloleoylamide, N-isopropyl-N-glucatyllauroylamide, N-methyl - N - galactatylstearoylamide, N-methyl-N-fructatylstearoylamide, N-methyl-N-glucatyltricontanoylamide, N - methyl - N - arabityl-stearoylamide and the like. The above compounds have also been designated as -amide as well as -oylamide, thus N-glucatylstearoylamide can also be designated N-glucatyl-stearamide, etc.

In carrying out my improved process, I have found that when amounts as low as 5 p.p.m. and as high as 500 p.p.m. by weight of my inhibitors based on the weight of the formaldehyde solution are incorporated in the formaldehyde solution, suitable results can be obtained. However, to obtain optimum results I usually prefer to utilize from about 25 to about 250 p.p.m. of my inhibitors.

In another embodiment of the present invention, I have found that inclusion in the formaldehyde solution along with the above-described inhibitors of small amounts of a methylpolysiloxane not only inhibits foaming tendencies but in addition further enhances the stability of the aqueous formaldehyde solution. The methylpolysiloxane anti-foam agents suitable for use in the invention include methylpolysiloxanes of at least 200 cs. viscosity at 25° C., preferably about 250 to 1000 cs. at at 25° C. Preferably these methylpolysiloxanes contain from about 1.9 to 2.1 methyl radicals per silicon atom. Although siloxanes having viscosities above 1000 cs. are operative they present handling problems. The methylpolysiloxanes can be prepared by any of the conventional methods for preparing siloxanes.

A filler can be advantageously employed with the methylpolysiloxane in an amount of about 2 to 10, preferably 4 to 7, parts by weight of filler per 100 parts by weight of the siloxane. Suitable fillers include silica fillers, e.g., silica and silica aerogel.

Since methyl methylpolysiloxanes are water-insoluble it is preferred to add the siloxane to the aqueous formaldehyde solution as an emulsion. Suitable emulsions can be prepared by using an emulsifying or suspending agent as, for instance, methyl-, ethyl-, and propylcellulose in amounts sufficient to suspend the siloxane in a water solution, for instance, these amounts may range from about 1 part to 100 parts by weight of suspending agent per 100 parts by weight of siloxane. In addition to the suspending agents, dispersants and other additives may also be included. For instance, sorbic acid may be used in amounts generally from about 0.001 to 1 part, usually 0.05 to 0.2 part, by weight per 100 parts by weight of siloxane.

A preferred manner of incorporating the methylpolysiloxane into the formaldehyde solution is by way of a siloxane emulsion composition, one such composition being available commercially and known as Dow Corning Antifoam "C," one sample of which contained the following ingredients:

| | Parts by weight |
|---|---|
| Dimethylpolysiloxane (250–1,000 cs.) | 27.5–30.5 |
| Silica | 1.0–1.5 |
| Methyl cellulose | Emulsifying amounts |
| Sorbic acid | 0.05–0.10 |
| Water | 53.4–59 |

The methylpolysiloxane compositions (e.g., Dow Corning "C") can be incorporated in the aqueous formaldehyde solution containing the amides noted above in amounts sufficient to enhance the stability and thus improve the clarity of the solutions. Generally these amounts fall in the range of about 1 p.p.m. to 1000 p.p.m., preferably about 10 to 50 p.p.m., based on the weight of the formaldehyde solution.

The following examples serve to illustrate my invention, but is it not intended that my invention be limited to the procedures or specific materials set forth therein.

*Example I*

To a 1,000 ml. portion of 44% formaldehyde solution containing 1% methanol was added 1.25 ml. of a methanol solution containing N-methyl-N-glucatyllauroylamide to get a formaldehyde solution containing 50 p.p.m. of N-methyl-N-glucatyllauroylamide. The thus treated solution and a 1,000 ml. portion of a 44% formaldehyde solution containing 1% methanol but no N-methyl-N-glucatyllauroylamide were heated to about 100° F. and maintained at that temperature for 30 days. At the end of the 30-day period the two portions were observed. The first portion containing the inhibitor showed no solid deposition while the second portion containing no inhibitor was quite cloudy and showed a great deal of solid deposition. The temperature of the two portions was then lowered to 60° F. and solid deposition occurred in each portion. The two portions were then heated to 120° F. with accompanying agitation. The solid material in the inhibited portion was observed to have substantially disappeared while the solid material in the portion not treated with the inhibitor was observed to be substantially unchanged.

*Example II*

The procedure of Example I was followed except that N-methyl-N-glucatyloleoylamide was utilized instead of N-methyl-N-glucatyllauroylamide. Results similar to those of Example I were obtained.

*Example III*

The procedure of Exmaple I was followed except that a 37 percent formaldehyde solution was used and N-methyl-N-glucatylstearoylamide was utilized instead of N-methyl-N-glucatyllauroylamide. The solution was stored at ambient conditions and 19 months later it was still found free of precipitated paraformaldehyde. A control sample precipitated formaldehyde within a week.

*Example IV*

The procedure of Example I is followed except that N-methyl-N-glucatylcapryloylamide is utilized instead of N-methyl-N-glucatyllauroylamide.

*Example V*

The procedure of Example I is followed except that N-butyl-N-glucatylcaproylamide is utilized instead of N-methyl-N-glucatyllauroylamide.

*Example VI*

The procedure of Example I is followed with the exception that N-methyl-N-fructatyloleoylamide is utilized instead of N-methyl-N-glucatyllauroylamide.

*Example VII*

The procedure of Example I is followed with the exception that N-methyl-N-galactatylstearoylamide is utilized instead of N-methyl-N-glucatyllauroylamide.

*Example VIII*

The procedure of Example I is followed with the exception that N-isopropyl-N-glucatyllauroylamide is utilized instead of N-methyl-N-glucatyllauroylamide.

*Example IX*

The procedure of Example I is followed with the exception that N-methyl-N-glucatyltricontanoylamide is utilized instead of N-methyl-N-glucatyllauroylamide.

*Example X*

The procedure of Example I is followed with the exception that N-glucatylstearoylamide is utilized instead of N-methyl-N-glucatyllauroylamide.

*Example XI*

The procedure of Example I is followed with the exception that N-methyl-N-arabatylstearoylamide is utilized instead of N-methyl-N-glucatyllauroylamide.

*Example XII*

The procedure of Example I is followed with the exception that N-methyl-N-ribitylstearoylamide is utilized instead of N-methyl-N-glucatyllauroylamide.

*Example XIII*

The procedure of Example I is followed with the exception that N-xylitylstearoylamide is utilized instead of N-methyl-N-glucatyllauroylamide.

*Example XIV*

The procedure of Example I is followed with the exception that N-mannitylstearoylamide is utilized instead of N-methyl-N-glucatyllauroylamide.

*Example XV*

To each of a series of 1,000 ml. portions of 44% formaldehyde solution was added respectively 10, 25 and 50 p.p.m. of N-methyl-N-glucatyl-stearoylamide in methanol solution and 10, 25 and 50 p.p.m. of Dow Corning Antifoam "C" described supra. After 6 days storage the prepared samples were examined and found to be clear with no solid deposition.

For comparison, samples were also prepared using the same procedure but employing Dow Corning Antifoam "C" alone. After 6 days storage the samples were observed and the samples showed considerable solid deposition.

The samples containing N-methyl-N-glucatylstearoylamide alone showed no solid deposition but were hazy in appearance when compared to the samples containing the combination of the amine and Dow Corning "C."

*Examples XVI–XXIII*

The procedure of Example I is followed with N-methyl-N-glucatylstearoylamide being added to aqueous form- Now having described my invention, what I claim is:

1. An aqueous formaldehyde solution comprising aqueous formaldehyde and a sufficient amount of a compound having the following general formula:

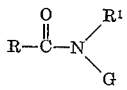

wherein R is the residue of a fatty acid having at least 7 carbon atoms, wherein $R^1$ is selected from the group consisting of hydrogen and lower alkyl, and wherein G is a glycityl radical having at least 5 carbon atoms to stabilize said solution against deposition of solid material from the solution.

2. The aqueous formaldehyde solution of claim 1 in which methylpolysiloxane is suspended with an emulsifying amount of an emulsifying agent, said methylpolysiloxane having a viscosity of at least 200 centistokes at 25° C. and being added in amounts sufficient to further enhance the stability of the aqueous formaldehyde solution.

3. An aqueous formaldehyde solution comprising aqueous formaldehyde and a sufficient amount of N-methyl-N-glucatyllauroylamide to stabilize said solution against deposition of solid material from the solution.

4. An aqueous formaldehyde solution comprising aqueous formaldehyde and a sufficient amount of N-methyl-N-glucatylstearoylamide to stabilize said solution against deposition of polymerized formaldehyde from the solution.

5. An aqueous formaldehyde solution comprising aqueous formaldehyde and a sufficient amount of N-methyl-N-glucatylcapryloylamide to stabilize said solution against deposition of polymerized formaldehyde from the solution.

6. An aqueous formaldehyde solution comprising aqueous formaldehyde and a sufficient amount of N-methyl-N-fructatyloleoylamide to stabilize said solution against deposition of polymerized formaldehyde from the solution.

7. An aqueous formaldehyde solution comprising aqueous formaldehyde and a sufficient amount of N-isopropyl-N-glucatyllauroylamide to stabilize said solution against deposition of polymerized formaldehyde from the solution.

8. An aqueous formaldehyde solution comprising aqueous formaldehyde and a sufficient amount of N-glucatylstearoylamide to stabilize said solution against deposition of polymerized formaldehyde from the solution.

9. An aqueous formaldehyde solution comprising aqueous formaldehyde and a sufficient amount of N-methyl-N-arabatylstearoylamide to stabilize said solution against deposition of polymerized formaldehyde from the solution.

10. An aqueous formaldehyde solution comprising aqueous formaldehyde and from about 5 p.p.m. to about 500 p.p.m. of a compound having the following general formula:

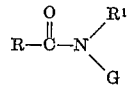

wherein R is the residue of a fatty acid having not less than 7 carbon atoms, wherein $R_1$ is selected from the group consisting of hydrogen and lower alkyl and wherein G is a glycityl radical having at least 5 carbon atoms.

11. An aqueous formaldehyde solution comprising aqueous formaldehyde and from about 5 p.p.m. to about 500 p.p.m. of a compound having the following general formula:

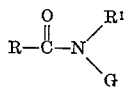

wherein R is the residue of a fatty acid having not less than 7 carbon atoms, wherein $R^1$ is selected from the group consisting of hydrogen and lower alkyl, and wherein G is a glycityl radical having at least 5 carbon atoms, and having from about 10 p.p.m. to 1000 p.p.m. of a methylpolysiloxane suspended therein with an emulsifying amount of an emulsifying agent, said methyl polysiloxane having a viscosity of about 250 to 1000 centistokes at 25° C.

12. The solution of claim 1 wherein G in the formula is a glycityl radical of 5 to 6, carbon atoms, $R_1$ is hydrogen and R is a residue of a fatty acid having 7 to 18 carbon atoms.

13. The solution of claim 1 wherein the aqueous formaldehyde solution is about 44% formaldehyde.

14. The solution of claim 2 wherein said emulsifying agent is methyl cellulose.

15. The solution of claim 1 wherein G in the formula is a glycityl radical of 5 to 6 carbon atoms, $R^1$ is lower alkyl and R is a residue of a fatty acid having 7 to 18 carbon atoms.

16. The aqueous formaldehyde solution of claim 1 wherein R is an alkyl radical having at least 7 carbon atoms.

17. An aqueous formaldehyde solution comprising aqueous formaldehyde and from about 5 p.p.m. to about 500 p.p.m. of N-methyl-N-glucatylstearoylamide and having from about 10 p.p.m. to 1000 p.p.m. of a methylpolysiloxane suspended therein with an emulsifying amount of an emulsifying agent, said methyl polysiloxane having a viscosity of about 250 to 1000 centistrokes at 25° C.

18. The solution of claim 17 wherein said emulsifying agent is cellulose.

References Cited by the Examiner
UNITED STATES PATENTS 2,000,152  5/35  Walker _____ 260—606
3,137,736  6/64  Prinz et al. _____ 260—606

LEON ZITVER, *Primary Examiner*.